United States Patent
Takai et al.

(10) Patent No.: US 12,129,954 B2
(45) Date of Patent: Oct. 29, 2024

(54) SEAMLESS STEEL PIPE HAVING DESIRABLE SULFURIC ACID DEW-POINT CORROSION RESISTANCE, AND METHOD FOR MANUFACTURING SAME

(71) Applicant: JFE Steel Corporation, Tokyo (JP)

(72) Inventors: Hiroyuki Takai, Tokyo (JP); Mitsuhiro Okatsu, Tokyo (JP); Yasumasa Takemura, Tokyo (JP); Tatsuo Koide, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 0 days.

(21) Appl. No.: 17/623,930

(22) PCT Filed: Jun. 12, 2020

(86) PCT No.: PCT/JP2020/023143
§ 371 (c)(1),
(2) Date: Dec. 30, 2021

(87) PCT Pub. No.: WO2021/005959
PCT Pub. Date: Jan. 14, 2021

(65) Prior Publication Data
US 2022/0364671 A1    Nov. 17, 2022

(30) Foreign Application Priority Data
Jul. 9, 2019   (JP) ................................ 2019-127601

(51) Int. Cl.
| | | |
|---|---|---|
| *F16L 58/00* | (2006.01) | |
| *C21D 6/00* | (2006.01) | |
| *C21D 9/08* | (2006.01) | |
| *C22C 38/00* | (2006.01) | |
| *C22C 38/02* | (2006.01) | |
| *C22C 38/06* | (2006.01) | |
| *C22C 38/42* | (2006.01) | |
| *C22C 38/44* | (2006.01) | |
| *C22C 38/50* | (2006.01) | |
| *C22C 38/52* | (2006.01) | |
| *C22C 38/58* | (2006.01) | |
| *F16L 9/02* | (2006.01) | |

(52) U.S. Cl.
CPC .............. *F16L 58/00* (2013.01); *C21D 6/004* (2013.01); *C21D 6/005* (2013.01); *C21D 6/008* (2013.01); *C21D 9/085* (2013.01); *C22C 38/001* (2013.01); *C22C 38/002* (2013.01); *C22C 38/008* (2013.01); *C22C 38/02* (2013.01); *C22C 38/06* (2013.01); *C22C 38/42* (2013.01); *C22C 38/44* (2013.01); *C22C 38/50* (2013.01); *C22C 38/52* (2013.01); *C22C 38/58* (2013.01); *F16L 9/02* (2013.01); *C21D 2211/002* (2013.01); *C21D 2211/005* (2013.01); *C21D 2211/008* (2013.01)

(58) Field of Classification Search
CPC .......... F16L 58/00; F16L 9/02; C22C 38/001; C22C 38/002; C22C 38/008; C22C 38/02; C22C 38/06; C22C 38/42; C21D 9/085
USPC ........................................................ 428/586
See application file for complete search history.

(56) References Cited

U.S. PATENT DOCUMENTS

| | | | |
|---|---|---|---|
| 2005/0013722 A1 | 1/2005 | Usami et al. | |
| 2012/0042992 A1 | 2/2012 | Kondo et al. | |
| 2013/0000791 A1* | 1/2013 | Takahashi | ............... C22C 38/06 |
| | | | 148/507 |
| 2016/0369381 A1* | 12/2016 | Kondo | .................. C22C 38/001 |
| 2017/0114425 A1 | 4/2017 | Katagiri et al. | |

FOREIGN PATENT DOCUMENTS

| | | | |
|---|---|---|---|
| CN | 10535872 | A | 2/2016 |
| CN | 105925899 | A | 9/2016 |
| CN | 105937010 | A | 9/2016 |
| CN | 109082591 | A1 | 12/2018 |
| EP | 3018229 | A1 | 5/2016 |
| JP | 56096052 | A * | 8/1981 |
| JP | 1121623 | A | 1/1999 |
| JP | 2003213367 | A | 7/2003 |
| JP | 2009046750 | A | 3/2009 |
| JP | 5857491 | B2 * | 2/2016 |
| JP | 2017014577 | A | 1/2017 |
| JP | 2017160544 | A | 9/2017 |

(Continued)

OTHER PUBLICATIONS

Ishikawa et al., JP 5857491 B2 Google Patents machine translation printed on May 23, 2023, Jul. 10, 2026, entire translation (Year: 2016).*

Crestwood Tubulars Inc., "Seamless Steel Pipe: Applications & Pipe Distribution Information", Feb. 4, 2019, URL: <https://web.archive.org/web/20190204005723/http://www.crestwoodtubulars.com/seamless-steel-pipe.html>, pp. 1-2 (Year: 2019).*

Wang et al., CN-109082591-A Google Patents machine translation printed Aug. 21, 2023, Dec. 25, 2018, entire translation (Year: 2018).*

(Continued)

*Primary Examiner* — Katherine A Christy
(74) *Attorney, Agent, or Firm* — Buchanan Ingersoll & Rooney PC

(57) ABSTRACT

A seamless steel pipe of the present invention is a seamless steel pipe having a composition including, in mass %, C: 0.01 to 0.12%, Si: 0.01 to 0.8%, Mn: 0.10 to 2.00%, P: 0.050% or less, S: 0.040% or less, Al: 0.010 to 0.100%, Cu: 0.03 to 0.80%, Ni: 0.01 to 0.50%, Mo: 0.01 to 0.20%, Sb: 0.002 to 0.50%, Cr: 0.004% or less, W: 0.002% or less, and the balance Fe and incidental impurities, and a structure including a ferrite phase having an area percentage of 50 to 65%, a pearlite phase having an area percentage of 2% or less, and one or both of a bainite phase and a martensitic phase representing the remainder, the seamless steel pipe having a yield strength of 230 MPa or more, and a tensile strength of 380 MPa or more.

6 Claims, No Drawings

(56) References Cited

FOREIGN PATENT DOCUMENTS

| | | |
|---|---|---|
| WO | 2018038195 A1 | 3/2018 |
| WO | 2018038196 A1 | 3/2018 |
| WO | 2018038197 A1 | 3/2018 |
| WO | 2018038198 A1 | 3/2018 |

OTHER PUBLICATIONS

Ishikawa et al., Partial human translation (Table 2) JP 5857491B2 on Aug. 22, 2023, Feb. 10, 2016, translation of Table 2 (Year: 2016).*

Bando et al., JP-56096052-A Machine Translation printed on Nov. 20, 2023, Aug. 3, 1981, entire translation (Year: 1981).*

Chinese Office Action with Search Report for Chinese Application No. 202080049961.5, dated Apr. 6, 2022, 10 pages.

International Search Report and Written Opinion for International Application No. PCT/JP2020/023143, dated Aug. 18, 2020, 5 pages.

Extended European Search Report for European Application No. 20837793.7, dated Dec. 1, 2022, 7 pages.

\* cited by examiner

SEAMLESS STEEL PIPE HAVING DESIRABLE SULFURIC ACID DEW-POINT CORROSION RESISTANCE, AND METHOD FOR MANUFACTURING SAME

CROSS REFERENCE TO RELATED APPLICATIONS

This is the U.S. National Phase application of PCT/JP2020/023143, filed Jun. 12, 2020, which claims priority to Japanese Patent Application No. 2019-127601, filed Jul. 9, 2019, the disclosures of these applications being incorporated herein by reference in their entireties for all purposes.

FIELD OF THE INVENTION

The present invention relates to a seamless steel pipe having desirable sulfuric acid dew-point corrosion resistance, and to a method for manufacturing the same. Specifically, the present invention relates to a seamless steel pipe suitable for piping in a sulfuric acid dew-point corrosive environment created by the combustion exhaust gas of boilers, gasification melting furnaces, and the like, particularly, a seamless steel pipe for piping that exhibits desirable sulfuric acid dew-point corrosion resistance in a heat recovery steam generator, and to a method for manufacturing such a seamless steel pipe.

BACKGROUND OF THE INVENTION

In the gas flue of boilers, thermal power plants, and other such devices or facilities that burn sulfur-containing fuel such as heavy oil and coal, the sulfur oxide contained in exhaust gas turns into sulfuric acid as it condenses with a temperature drop. This causes severe corrosion called sulfuric acid dew-point corrosion.

Various proposals have been made to reduce sulfuric acid dew-point corrosion. For example, PTL 1 discloses a steel containing 0.001 to 0.2 mass % carbon and to which appropriate amounts of Si, Mn, P, and S, and, additionally, Cu: 0.1 to 1 mass %, Mo: 0.001 to 1 mass %, and Sb: 0.01 to 0.2 mass % are added to obtain a sulfuric acid dew-point corrosion resistant steel containing controlled amounts of Sb, C, and Mo satisfying a specific relationship.

PTL 2 discloses a steel of a composition (hereinafter, "basic composition") comprising, in mass %, 0.050 to 0.150% carbon, appropriate amounts of Si, Mn, P, and S, and Cu: 0.20 to 0.50%, Ni: 0.10 to 0.80%, Cr: 0.20 to 1.50%, Sb: 0.050 to 0.300%, and Ti: 0.005 to 0.050%, and in which the S, Cu, and Sb contents, and the Cu, Ni, and Sb contents are specified by specific relations, and the area percentage of a ferrite phase, the area percentage of a pearlite phase, and the total area percentage of structures other than the ferrite phase and the pearlite phase in the steel structure are controlled to obtain a sulfuric acid dew-point corrosion resistant steel.

PTL 3 discloses a steel of the foregoing basic composition comprising Co: 0.002 to 0.020% and in which the S, Cu, and Sb contents, and the Cu, Ni, Sb, and Co contents are specified by specific relations, and the area percentage of a ferrite phase, the area percentage of a pearlite phase, and the total area percentage of structures other than the ferrite phase and the pearlite phase in the steel structure are controlled to obtain a sulfuric acid dew-point corrosion resistant steel.

PTL 4 discloses a steel of the foregoing basic composition comprising Co: 0.002 to 0.020% and W: 0.005 to 0.200%, and in which the S, Cu, Sb, and W contents, and the Cu, Ni, Sb, and Co contents are specified by specific relations, and the area percentage of a ferrite phase, the area percentage of a pearlite phase, and the total area percentage of structures other than the ferrite phase and the pearlite phase in the steel structure are controlled to obtain a sulfuric acid dew-point corrosion resistant steel.

PTL 5 discloses a steel of the foregoing basic composition comprising Co: 0.002 to 0.020% and Sn: 0.005 to 0.100%, and in which the S, Cu, Sn, and Sb contents, and the Cu, Ni, Sn, Sb, and Co contents are specified by specific relations, and the area percentage of a ferrite phase, the area percentage of a pearlite phase, and the total area percentage of structures other than the ferrite phase and the pearlite phase in the steel structure are controlled to obtain a sulfuric acid dew-point corrosion resistant steel.

PTL 6 discloses a steel comprising, in mass %, 0.001 to 0.15% carbon, appropriate amounts of Si, Mn, P, and S, and additionally, Cu: 0.10 to 1.00%, Ni: 0.50% or less, Cr: 0.05 to 0.25%, Mo: 0.01 to 0.08%, Al: 0.100% or less, Ti, Nb, and V: 0 to 0.20% or less in total, B: 0 to 0.010%, and Sb and Sn: 0 to 0.10% in total are added, and having a ferrite single phase structure, or a structure containing a total of 30 volume % or less of at least one of cementite, pearlite, bainite, and martensite, and in which the balance is a ferrite phase, with ferrite crystal grains having a controlled average crystal grain size of 12.0 μm or less to obtain a steel sheet having desirable sulfuric acid dew-point corrosion resistance.

PATENT LITERATURE

PTL 1: JP-A-2003-213367
PTL 2: WO2018/038198
PTL 3: WO2018/038195
PTL 4: WO2018/038196
PTL 5: WO2018/038197
PTL 6: JP-A-2017-160544

SUMMARY OF THE INVENTION

The techniques disclosed in PTL 1 to PTL 6 are all intended to lower the sulfuric acid dew-point corrosion rate or hydrochloric acid dew-point corrosion rate, and are probably effective at inhibiting formation of sulfuric acid dew-point corrosion products, which cause problems in applications such as in heat recovery steam generators. It is, however, difficult to sufficiently inhibit sulfuric acid dew-point corrosion in a more severe environment with a sulfuric acid concentration as high as 70 mass %. The foregoing related art documents also do not contain detailed descriptions related to manufacture of a seamless steel pipe suited for piping in heat recovery steam generators, and do not provide optimum conditions that ensure both sulfuric acid dew-point corrosion resistance and manufacturability of a seamless steel pipe.

Aspects of the present invention were made under these circumstances, and it is an object according to aspects of the present invention to provide a seamless steel pipe having desirable sulfuric acid dew-point corrosion resistance, and that is suited for piping in a sulfuric acid dew-point corrosive environment such as in a heat recovery steam generator while being desirably manufacturable.

Another object according to aspects of the present invention is to provide a suitable method of manufacture of the seamless steel pipe.

In order to find a solution to the foregoing problems, the present inventors experimentally produced seamless steel pipes of the compositions and steel structures (microstructures) shown in Table 1 and of dimensions measuring 140 mm in outer diameter and 10.5 mm in wall thickness. The microstructures of the test steel pipes (steel pipe Nos. I-1 to IV-2) shown in Table 1 were examined as follows.

First, an observation sample was taken from arbitrarily chosen longitudinal and circumferential locations of the steel pipe, and a cross section orthogonal to the longitudinal direction of the steel pipe was polished to a mirror finish to provide an observation surface. For observation of microstructure, the surface was etched with a 5% solution of nitric acid and alcohol. After etching, randomly chosen four fields at the center of the wall thickness of the observation sample were photographed with a light microscope (400×). For each steel, the type of microstructure was then determined from the micrograph. The microstructures are different because of the difference in the heat treatment applied to the steel pipe, specifically, the normalizing heat treatment and the subsequent cooling method.

A corrosion test specimen (30 mm in length×20 mm in width×5 mm in thickness) including an outer surface of steel pipe was taken from the outer surface side of steel pipe, and a surface corresponding to the outer surface side of steel pipe was ground by 0.5 mm to remove unwanted components such as scale. A corrosion test was conducted in a sulfuric acid dew-point environment, as follows. The test environment was created by simulating an environment with a 70 mass % sulfuric acid dew-point concentration at around 50° C., a temperature region where the most severe corrosion should occur in a heat recovery pipe of a heat recovery steam generator. Specifically, a sulfuric acid aqueous solution that had been adjusted to a concentration of 70 mass % was poured into a container, and the corrosion test specimen was immersed in the solution after the solution was heated and maintained at 50° C. with an external thermostat bath. The specimen was immersed for two different time lengths: 8 hours and 96 hours. After each immersion, the sulfuric acid aqueous solution was discharged from the container, and the corrosion test specimen was dried, and carefully taken out for weight measurement. For each corrosion test conducted with different immersion times, the corrosion rate was calculated from the pre-measured surface area and weight of the corrosion test specimen before corrosion test, the weight of corrosion test specimen measured after immersion, and the immersion time. The results are presented in Table 1.

TABLE 1

| Steel No. | Composition (mass %) | | | | | | | | | | | | Steel pipe No. | Steel pipe heat treatment | Microstructure | Corrosion rate in Corrosion test* with 8-h immersion (mg/cm$^2$/h) | Corrosion rate in Corrosion test* with 96-h immersion (mg/cm$^2$/h) | Remarks |
|---|---|---|---|---|---|---|---|---|---|---|---|---|---|---|---|---|---|---|
| | C | Si | Mn | P | S | Al | Cu | Ni | Sb | Mo | Cr | W | | | | | | |
| I | 0.11 | 0.3 | 0.56 | 0.012 | 0.003 | 0.023 | 0.3 | 0.13 | 0.06 | — | — | — | I-1 | Normalization followed by air cooling | Ferrite + pearlite | 14 | 34 | |
| | | | | | | | | | | | | | I-2 | Normalization followed by accelerated cooling | Ferrite + pearlite + bainite | 13 | 26 | |
| II | 0.11 | 0.2 | 0.54 | 0.012 | 0.003 | 0.031 | 0.2 | 0.12 | 0.06 | 0.16 | — | — | II-1 | Normalization followed by air cooling | Ferrite + pearlite + bainite | 19 | 24 | |
| | | | | | | | | | | | | | II-2 | Normalization followed by accelerated cooling | Ferrite + bainite | 17 | 18 | |
| III | 0.10 | 0.3 | 0.55 | 0.011 | 0.002 | 0.028 | 0.3 | 0.13 | 0.06 | — | 0.10 | — | III-1 | Normalization followed by air cooling | Ferrite + pearlite + bainite | 15 | 22 | |
| | | | | | | | | | | | | | III-2 | Normalization followed by accelerated cooling | Ferrite + bainite | 16 | 18 | Season cracking in steel pipe |

TABLE 1-continued

| Steel No. | Composition (mass %) | | | | | | | | | | | | Steel pipe No. | Steel pipe heat treatment | Micro-structure | Corrosion rate in Corrosion test* with 8-h immersion (mg/cm²/h) | Corrosion rate in Corrosion test* with 96-h immersion (mg/cm²/h) | Remarks |
|---|---|---|---|---|---|---|---|---|---|---|---|---|---|---|---|---|---|---|
| | C | Si | Mn | P | S | Al | Cu | Ni | Sb | Mo | Cr | W | | | | | | |
| IV | 0.11 | 0.2 | 0.54 | 0.013 | 0.003 | 0.026 | 0.2 | 0.13 | 0.06 | — | — | 0.034 | IV-1 | Normalization followed by air cooling | Ferrite + pearlite | 12 | 27 | |
| | | | | | | | | | | | | | IV-2 | Normalization followed by accelerated cooling | Ferrite + pearlite + bainite | 11 | 21 | Season cracking in steel pipe |

*Immersion in 50° C., 70 mass % sulfuric acid aqueous solution

As can be seen from Table 1, the corrosion rate was higher in the corrosion test with 96-hour immersion time than in the corrosion test with 8-hour immersion time. With regard to steel microstructure, the corrosion rate in 96-hour corrosion test was found to be relatively smaller in steel pipes having a ferrite, pearlite, and bainite structure (ferrite+pearlite+bainite) than in steel pipes having a ferrite and pearlite structure (ferrite+pearlite), and was even smaller in steel pipes having a ferrite and bainite structure (ferrite+bainite). Cross section observations of the corrosion test specimen after the corrosion test revealed that corrosion was more concentrated in regions of corrosion test specimen where mostly the pearlite structure was exposed on surface. The result suggests that increasing the area percentage of pearlite structure increases the rate of corrosion over the course of long immersion time.

After further studies, the present inventors found combinations of steel compositions and seamless steel pipe manufacturing conditions that can inhibit formation of pearlite structure that leads to corrosion development particularly during long immersion, and satisfactory ranges of compositions and manufacturing conditions for preventing various defects that occur during manufacture of a seamless steel pipe.

Aspects of the present invention were completed on the basis of these findings, and are as follows.

[1] A seamless steel pipe having desirable sulfuric acid dew-point corrosion resistance, the seamless steel pipe having a composition including, in mass %, C: 0.01 to 0.12%, Si: 0.01 to 0.8%, Mn: 0.10 to 2.00%, P: 0.050% or less, S: 0.040% or less, Al: 0.010 to 0.100%, Cu: 0.03 to 0.80%, Ni: 0.01 to 0.50%, Mo: 0.01 to 0.20%, Sb: 0.002 to 0.50%, Cr: 0.004% or less, W: 0.002% or less, and the balance Fe and incidental impurities, and a structure including a ferrite phase having an area percentage of 50 to 65%, a pearlite phase having an area percentage of 2% or less, and one or both of a bainite phase and a martensitic phase representing the remainder, the seamless steel pipe having a yield strength of 230 MPa or more, and a tensile strength of 380 MPa or more.

[2] The seamless steel pipe having desirable sulfuric acid dew-point corrosion resistance according to [1], wherein the composition further includes, in mass %, one or two groups selected from the following group A and group B, group A: one or both of Sn: 0.005 to 0.50% and Co: 0.005 to 0.20%, group B: Ti: 0.005 to 0.050%.

[3] A method for manufacturing the seamless steel pipe having desirable sulfuric acid dew-point corrosion resistance according to [1] or [2], the method including:

heating a steel pipe material of said composition to 1,100 to 1,300° C., hot rolling the heated steel pipe material at 800° C. or more into a seamless steel pipe of a predetermined shape, and cooling the seamless steel pipe to room temperature; and heating the seamless steel pipe at a normalizing temperature of 850 to 1,050° C. in a normalizing heat treatment, followed by accelerated cooling to a cooling stop temperature of 500° C. or less at an average cooling rate of 10 to 50° C./s.

[4] The method according to [3], including a tempering heat treatment in which the seamless steel pipe after the accelerated cooling is cooled to room temperature, and reheated at a tempering temperature of 400 to 700° C.

In accordance with aspects of the present invention, the area percentage of ferrite phase in steel structure (microstructure) refers to a value calculated by dividing the sum area of the ferrite phase in an observed field by the field area of when a cross section orthogonal to the longitudinal direction of a steel pipe is observed under a light microscope. Similarly, the area percentage of pearlite phase in steel microstructure refers to a value calculated by dividing the sum area of the pearlite phase in an observed field by the field area of when a cross section orthogonal to the longitudinal direction of a steel pipe is observed under a light microscope.

In accordance with aspects of the present invention, "desirable sulfuric acid dew-point corrosion resistance" means a corrosion rate of 20 mg/cm²/h or less as measured when a corrosion test specimen taken from the outer surface of a seamless steel pipe is immersed for 96 hours in a 70 mass % sulfuric acid aqueous solution heated and maintained at 50° C. in a corrosion test.

Aspects of the present invention can provide a seamless steel pipe having desirable sulfuric acid dew-point corrosion resistance, and that is suited for piping in a sulfuric acid dew-point corrosive environment such as in a heat recovery steam generator while being desirably manufacturable. Aspects of the present invention can also provide a suitable method of manufacture of the seamless steel pipe.

A seamless steel pipe according to aspects of the present invention has desirable sulfuric acid dew-point corrosion resistance, and decrease of lifetime and damage due to corrosion can be inhibited even in a severe environment with a sulfuric acid concentration as high as 70 mass %, such as in a heat recovery steam generator. A seamless steel pipe according to aspects of the present invention also has a predetermined yield strength and tensile strength, and is suited for piping. A seamless steel pipe according to aspects of the present invention has desirable manufacturability with good formability and reduced post-heat treatment season cracking in the manufacturing process.

DETAILED DESCRIPTION OF EMBODIMENTS OF THE INVENTION

Embodiments of the present invention are described below in detail.

First, the reasons for limiting the composition of a seamless steel pipe having desirable sulfuric acid dew-point corrosion resistance according to aspects of the present invention are described below. As used herein, "%" used as a unit of the content of a component means "mass %", unless otherwise specifically stated. A seamless steel pipe having desirable sulfuric acid dew-point corrosion resistance according to aspects of the present invention will also be referred to simply as "seamless steel pipe according to aspects of the present invention".

C: 0.01 to 0.12%

C is an element that increases steel strength. In accordance with aspects of the present invention, a C content of 0.01% or more is needed to satisfy the required yield strength and tensile strength, particularly when the seamless steel pipe is used for piping. For this reason, the C content is 0.01% or more. The C content is preferably 0.02% or more. A C content of more than 0.12% tends to cause season cracking due to steel hardening. The upper limit of C content is 0.12% because a C content of more than 0.12% leads to notable season cracking when the steel pipe is subjected to accelerated cooling after the normalizing heat treatment described below. The C content is preferably 0.08% or less, more preferably 0.06% or less.

Si: 0.01 to 0.8%

Si is an element that acts as a deoxidizing agent, and increases steel strength by forming a solid solution in steel. In accordance with aspects of the present invention, a Si content of 0.01% or more is needed to satisfy the required yield strength and tensile strength, particularly when the seamless steel pipe is used for piping. For this reason, the Si content is 0.01% or more. The Si content is preferably 0.1% or more, more preferably 0.2% or more. The upper limit of Si content is 0.8% because a Si content of more than 0.8% has adverse effects on sulfuric acid dew-point corrosion resistance. The Si content is preferably 0.6% or less, more preferably 0.4% or less.

Mn: 0.10 to 2.00%

Mn is an element that increases steel strength by improving hardenability. In accordance with aspects of the present invention, a Mn content of 0.10% or more is needed to satisfy the required yield strength and tensile strength, particularly when the seamless steel pipe is used for piping. For this reason, the Mn content is 0.10% or more. The Mn content is preferably 0.50% or more, more preferably 0.70% or more. The upper limit of Mn content is 2.00% because a Mn content of more than 2.00% tends to cause season cracking due to steel hardening, as with the case of carbon. The Mn content is preferably 1.80% or less, more preferably 1.40% or less.

P: 0.050% or Less

P causes serious centerline segregation during continuous casting, and leads to internal defects at the time of piercing during hot rolling of a seamless steel pipe, in addition to having adverse effects on sulfuric acid dew-point corrosion resistance. For this reason, it is preferable in accordance with aspects of the present invention that the P content be reduced as much as possible. However, a P content of at most 0.050% is acceptable. For this reason, the P content is 0.050% or less. The P content is preferably 0.030% or less, more preferably 0.015% or less. The lower limit of P content is not particularly limited. However, the preferred lower limit of P content is about 0.001% because excessive dephosphorization leads to increase of manufacturing cost.

S: 0.040% or Less

S also causes serious centerline segregation during continuous casting, and leads to internal defects at the time of piercing during hot rolling of a seamless steel pipe. A high S content has adverse effects on sulfuric acid dew-point corrosion resistance. For this reason, it is desirable in accordance with aspects of the present invention to reduce the S content as much as possible. However, a S content of at most 0.040% is acceptable. For this reason, the S content is 0.040% or less. The S content is preferably 0.010% or less, more preferably 0.003% or less. The lower limit of S content is not particularly limited. However, the preferred lower limit of S content is about 0.0005% because excessive desulfurization leads to increase of manufacturing cost.

Al: 0.010 to 0.100%

Al is an element that acts as a deoxidizing agent. An Al content of 0.010% or more is needed to reduce solid solution oxygen, and prevent undesirable effects such as decrease of the effective amount of Mn due to manganese oxide formation. For this reason, the Al content is 0.010% or more. The Al content is preferably 0.015% or more, more preferably 0.020% or more. The upper limit of Al content is 0.100% because an Al content of more than 0.100% results in producing large amounts of $Al_2O_3$ in the steel, and has adverse effects on sulfuric acid dew-point corrosion resistance. The Al content is preferably 0.080% or less, more preferably 0.040% or less.

Cu: 0.03 to 0.80%

Cu is an element that is effective at preventing steel corrosion in a sulfuric acid dew-point environment. The sulfuric acid dew-point corrosion resistance improving effect becomes even more prominent when Cu is added with Sb. A Cu content of 0.03% or more is needed to obtain these effects. For this reason, the Cu content is 0.03% or more. The Cu content is preferably 0.10% or more, more preferably 0.20% or more. It is well known that Cu decreases the high-temperature ductility of steel, and, accordingly, the upper limit of Cu content is 0.80% because a Cu content of more than 0.80% results in producing notable defects in outer surface during hot rolling. The Cu content is preferably 0.60% or less, more preferably 0.50% or less.

Ni: 0.01 to 0.50%

Ni is an element that inhibits decrease of high-temperature ductility of Cu when added to a Cu-containing steel. A Ni content of 0.01% or more is needed to obtain such an effect. For this reason, the Ni content is 0.01% or more. The Ni content is preferably 0.05% or more, more preferably 0.10% or more. The upper limit of Ni content is 0.50% because Ni is an expensive element to add, and the effect becomes saturated even when contained in an amount of more than 0.50%. The Ni content is preferably 0.30% or less, more preferably 0.25% or less.

Mo: 0.01 to 0.20%

Mo is an element that is known to interfere with sulfuric acid dew-point corrosion resistance. The pearlite phase in the microstructure of steel influences long-term sulfuric acid dew-point corrosion resistance (described later), and it is effective to reduce pearlite phase to improve long-term sulfuric acid dew-point corrosion resistance. Previous studies by the present inventors revealed that adding minute amounts of Mo effectively prevents formation of pearlite phase.

A Mo content of 0.01% or more is needed to provide the area percentage that is needed for the pearlite structure in the microstructure of a steel pipe, and improve long-term sulfuric acid dew-point corrosion resistance. For this reason, the Mo content is 0.01% or more. The Mo content is preferably 0.10% or more, more preferably 0.14% or more. The upper limit of Mo content is 0.20% because a Mo content of more than 0.20% results in serious deterioration of sulfuric acid dew-point corrosion resistance. The Mo content is preferably 0.18% or less, more preferably 0.16% or less.

Sb: 0.002 to 0.50%

Sb, as is Cu, is an element that is effective at preventing steel corrosion in a sulfuric acid dew-point corrosive environment, and greatly improves sulfuric acid dew-point corrosion resistance when added with Cu. An Sb content of 0.002% or more is needed to obtain these effects. For this reason, the Sb content is 0.002% or more. The Sb content is preferably 0.02% or more, more preferably 0.05% or more. Sb is also an element that decreases the high-temperature ductility of steel, and the upper limit of Sb content is 0.50% because an Sb content of more than 0.50% may result in failed tubing because of cracking occurring during the rolling of a steel pipe material. The Sb content is preferably 0.20% or less, more preferably 0.09% or less.

Cr: 0.004% or Less

Cr does not greatly affect the sulfuric acid dew-point corrosion resistance itself. However, Cr improves the hardenability of steel, and tends to cause season cracking when accelerated cooling is performed after the normalizing heat treatment of a steel pipe (described later). The Cr content needs to be 0.004% or less to inhibit cause season cracking. The lower limit of Cr content is not particularly limited. However, the Cr content is preferably 0.001% or more because a Cr content below 0.001% leads to increased manufacturing costs.

W: 0.002% or Less

W is an element that is effective at improving sulfuric acid dew-point corrosion resistance. However, W improves the hardenability of steel as does Cr, and tends to cause season cracking when accelerated cooling is performed after the normalizing heat treatment of a steel pipe (described later). A W content of 0.002% or less is needed to inhibit cause season cracking. The lower limit of W content is not particularly limited. However, the W content is preferably 0.0003% or more because a W content below 0.0003% results in increased manufacturing costs.

In addition to the foregoing preferred basic components, embodiments of the present invention may optionally contain one or both of Sn: 0.005 to 0.50% and Co: 0.005 to 0.20%, and/or Ti: 0.005 to 0.050%.

Sn: 0.005 to 0.50%

Sn may be contained for further reduction of corrosion in a sulfuric acid dew-point corrosive environment. A Sn content of 0.005% or more is needed to sufficiently produce the effect of adding Sn. For this reason, Sn, when contained, is contained in an amount of 0.005% or more. The Sn content is preferably 0.02% or more, more preferably 0.05% or more. The upper limit of Sn content, when contained, is 0.50% because Sn decreases the high-temperature ductility of steel, as does Sb. The Sn content is preferably 0.30% or less, more preferably 0.15% or less.

Co: 0.005 to 0.20%

Co may be contained for further reduction of corrosion in a sulfuric acid dew-point corrosive environment. A Co content of 0.005% or more is needed to sufficiently produce the effect of adding Co. For this reason, Co, when contained, is contained in an amount of 0.005% or more. The Co content is preferably 0.01% or more, more preferably 0.03% or more. The upper limit of Co content, when contained, is 0.20% because Co decreases the high-temperature ductility of steel, as does Sn. The Co content is preferably 0.08% or less, more preferably 0.06% or less.

Ti: 0.005 to 0.050%

Ti forms nitrides in steel, and inhibits austenite grain growth by the pinning effect when the steel turns into an austenitic phase, particularly at high temperatures. Because this enables formation of fine ferrite grains in subsequent ferrite transformation, Ti may be added for the purpose of improving yield strength through grain refinement strengthening. A Ti content of 0.005% or more is needed to achieve sufficient grain refinement. For this reason, Ti, when contained, is contained in an amount of 0.005% or more. The Ti content is preferably 0.008% or more, more preferably 0.010% or more. The upper limit of Ti content, when contained, is 0.050% because a Ti content of more than 0.050% results in coarse titanium nitride having adverse effects on sulfuric acid dew-point corrosion resistance. The Ti content is preferably 0.040% or less, more preferably 0.030% or less.

In the foregoing composition, the balance is Fe and incidental impurities. Specific examples of the incidental impurity elements include H, O, As, Zr, Ag, Ta, and Pb. The acceptable upper limits of these incidental impurity elements are H: 0.0005%, O: 0.004%, As: 0.006%, Zr: 0.0004%, Ag: 0.001%, Ta: 0.004%, and Pb: 0.005%.

The following describes the reasons for limiting the steel structure (microstructure) of a seamless steel pipe according to aspects of the present invention.

Area Percentage of Ferrite Phase: 50 to 65%

The lower limit of the area percentage of ferrite phase is 50% because, with an area percentage of ferrite phase of less than 50%, season cracking tends to occur in a steel pipe in the accelerated cooling performed after the normalizing heat treatment of a steel pipe to achieve an area percentage of 2% or less for the pearlite phase. The area percentage of ferrite phase is preferably 55% or more. The upper limit of the area percentage of ferrite phase is 65% because, with an area percentage of ferrite phase of more than 65%, the steel strength, particularly the yield strength, decreases, and the steel is unable to satisfy the yield strength required for piping. The area percentage of ferrite phase is preferably 60% or less.

Area Percentage of Pearlite Phase: 2% or Less

When the microstructure of a seamless steel pipe contains a pearlite phase, the corrosion rate of sulfuric acid dew-point corrosion increases when the steel pipe is immersed in a sulfuric acid aqueous solution (solution temperature: 50° C., concentration: 70 mass %) for prolonged time periods, as shown in the test results shown in Table 1. After extensive studies by the present inventors, it was found that the area percentage of pearlite phase in the microstructure needs to be 2% or less to avoid increase of corrosion rate. The area percentage of pearlite phase is preferably 1% or less, more preferably 0%. As an example of a method that confines the area percentage of pearlite phase in the controlled target range, Mo is added to steel, and accelerated cooling is performed after the normalizing heat treatment of a steel pipe.

In the steel microstructure of a seamless steel pipe according to aspects of the present invention, one or both of a bainite phase and a martensitic phase represent the remainder structures other than the ferrite phase and pearlite phase. Specifically, a seamless steel pipe according to aspects of the present invention has a steel microstructure having an area percentage of 50 to 65% for the ferrite phase, and an area percentage of 2% or less for the pearlite phase, with a bainite phase or a martensitic phase, or a bainite phase and a martensitic phase representing structures other than the ferrite phase and pearlite phase. The bainite phase and martensitic phase are structures that occur in the accelerated cooling performed after the normalizing heat treatment of a steel pipe. In accordance with aspects of the present invention, the area percentages of the bainite phase and martensitic phase are not particularly limited. The total area percentage of the remainder structure represented by one or both of the bainite phase and the martensitic phase is preferably 48% or less.

A seamless steel pipe according to aspects of the present invention has a yield strength of 230 MPa or more, and a tensile strength of 380 MPa or more to ensure the strength sufficient for piping. The yield strength is preferably 250 MPa or more. The tensile strength is preferably 400 MPa or more. The yield strength and tensile strength may be measured using the methods described in the Examples below.

A seamless steel pipe according to aspects of the present invention has desirable sulfuric acid dew-point corrosion resistance. Specifically, a seamless steel pipe according to aspects of the present invention has a corrosion rate of 20 mg/cm$^2$/h or less as measured by being immersed for 96 hours in a 50° C., 70 mass % sulfuric acid aqueous solution in a corrosion test, as described above. In this way, decrease of lifetime and damage due to corrosion can be inhibited even in a severe environment such as in a heat recovery steam generator. The corrosion rate is preferably 15 mg/cm$^2$/h or less, more preferably 10 mg/cm$^2$/h or less.

A method for manufacturing a seamless steel pipe according to aspects of the present invention is described below.

In accordance with aspects of the present invention, the steelmaking process is not particularly limited. For example, a molten steel of the foregoing composition can be made using an ordinary steelmaking process such as by using, for example, a converter, an electric furnace, or a vacuum melting furnace. For cost considerations, the molten steel is cast preferably by continuous casting. Continuous casting may be a process that continuously casts molten steel into a common cast piece having a rectangular cross section, such as a slab or a bloom, and hot rolls the cast piece into a steel pipe material of a circular cross section suited for steel pipe rolling (hereinafter, a steel pipe material produced by this process will be referred to also as "billet-rolled steel pipe material"), or a process that continuously casts molten steel directly into a steel pipe material having a circular cross section (hereinafter, a steel pipe material produced by this process will be referred to also as "direct-cast steel pipe material"). Either of these processes can be used in accordance with aspects of the present invention.

The steel pipe material (billet-rolled steel pipe material or direct-cast steel pipe material) is used to form a seamless steel pipe of a predetermined shape (tubing process). In the tubing process, the steel pipe material may be formed into a seamless steel pipe of a predetermined shape by a process that hot rolls the preheated steel pipe material (piercing followed by mandrel mill rolling or plug mill rolling into a predetermined wall thickness, and rolling into an appropriately reduced diameter). The heating temperature and hot rolling temperature of the steel pipe material are as follows. In accordance with aspects of the present invention, steel pipe material temperatures and steel pipe temperatures (such as the heating temperature and hot rolling temperature of a steel pipe material, and the normalizing temperature and cooling stop temperature of a steel pipe) are surface temperatures of steel pipe materials and steel pipes (outer surface temperature in the case of a steel pipe), unless otherwise specifically stated, and can be measured with, for example, a radiation thermometer.

Heating Temperature of Steel Pipe Material: 1,100 to 1,300° C.

In the tubing process, the steel pipe material is heated, and hot rolled into a seamless steel pipe of a predetermined shape. From the perspective of a rolling load, the lower limit of the heating temperature of the steel pipe material is 1,100° C. With a heating temperature below 1,100° C., it may not be possible to form a seamless steel pipe because of a rolling overload. From the perspective of preventing defects from occurring on the inner side of the pipe during piercing, the lower limit of heating temperature is preferably 1,150° C., more preferably 1,200° C. When heated to a temperature of more than 1,300° C., the steel pipe material may fail to have the microstructure fractions needed in accordance with aspects of the present invention, even after the steel pipe heat treatment (normalizing heat treatment and subsequent accelerated cooling) described below, with the result that sulfuric acid dew-point corrosion resistance is adversely affected. For this reason, the upper limit of the heating temperature of the steel pipe material is 1,300° C. The heating temperature of the steel pipe material is preferably 1,290° C. or less, more preferably 1,280° C. or less.

Hot Rolling Temperature: 800° C. or More

The lower limit of hot rolling temperature is 800° C. because a hot rolling temperature below 800° C. may overload the rolling process, and disable the formation of a seamless steel pipe. That is, the hot rolling end temperature is 800° C. or more. For example, when the hot rolling is a process starting from piercing followed by mandrel mill rolling or plug mill rolling and ending with diameter reduction rolling, the rolling end temperature of diameter reduction rolling is 800° C. or more. From the perspective of preventing defects from occurring in inner and outer surfaces of a steel pipe during hot rolling, the hot rolling temperature is preferably 830° C. or more, more preferably 850° C. or more.

The hot rolling is followed by cooling to room temperature. In accordance with aspects of the present invention, "room temperature" means 25° C. The cooling method is not particularly limited. Typically, cooling is achieved by air cooling with, for example, a cooling bed. However, cooling may be achieved by weak water cooling, in order to reduce the time to cool to room temperature, and to increase the number of rolled pipes per hour. As used herein, "air cooling" means natural cooling that takes place without the use of any cooling means. Typically, the average cooling rate of air cooling is 1° C./s or less.

The seamless steel pipe cooled to room temperature after the tubing process is subjected to a normalizing heat treatment and subsequent accelerated cooling (steel pipe heat treatment process). The steel pipe heat treatment process may include a tempering heat treatment optionally performed after accelerated cooling. The purpose of the normalizing heat treatment is to adjust the hardness of the seamless steel pipe to a predetermined strength suited for piping. In accordance with aspects of the present invention, the normalizing heat treatment is followed by accelerated cooling to control the steel microstructure, in order to inhibit formation of a pearlite structure, which preferentially becomes corroded in a 50° C., 70 mass % sulfuric acid aqueous solution created to simulate a sulfuric acid dew-point corrosion environment that causes the most severe corrosion in a steel pipe, particularly a heat recovery pipe of a heat recovery steam generator.

Normalizing Temperature: 850 to 1,050° C.

In the normalizing heat treatment, the steel pipe is heated to preferably a temperature region in which the steel turns into an austenitic phase, in order to regulate the grains in the microstructure of the steel pipe. With a normalizing temperature of less than 850° C. in the normalizing heat treatment, the steel does not fully turn into an austenitic phase, and an untransformed ferrite phase partially remains, and causes decrease of yield strength. For this reason, the normalizing temperature is 850° C. or more. The normalizing temperature is preferably 880° C. or more, more preferably 900° C. or more. When heated to a temperature above 1,050° C., serious coarsening of austenite crystal grains occurs, which produces a coarse ferrite phase after the transformation in accelerated cooling, and causes decrease of yield strength. For this reason, the upper limit of normalizing temperature is 1,050° C. The normalizing temperature is preferably 1,000° C. or less, more preferably 950° C. or less.

Average Cooling Rate of Accelerated Cooling: 10 to 50° C./s

The normalizing heat treatment is followed by accelerated cooling from the normalizing temperature to a cooling stop temperature. The accelerated cooling after the normalizing heat treatment is performed for the purpose of inhibiting formation of a pearlite phase in the microstructure of the steel pipe. As used herein, "average cooling rate of accelerated cooling" means an average cooling rate at an outer surface of a steel pipe in a temperature range of from normalizing temperature to cooling stop temperature. When the steel pipe is air cooled without accelerated cooling, or the average cooling rate of accelerated cooling is less than 10° C./s, the area percentage of pearlite phase exceeds 2%, and the corrosion rate increases in a long-hour sulfuric acid dew-point corrosion test. The average cooling rate of accelerated cooling is preferably 12° C./s or more, more preferably 15° C./s or more. The upper limit of the average cooling rate of accelerated cooling is 50° C./s because an average cooling rate of more than 50° C./s causes serious season cracking after accelerated cooling. The average cooling rate of accelerated cooling is preferably 30° C./s or less, more preferably 25° C./s or less.

Cooling Stop Temperature of Accelerated Cooling: 500° C. or Less

The cooling stop temperature of accelerated cooling is 500° C. or less to inhibit formation of a pearlite phase in the microstructure of the seamless steel pipe. Preferably, the cooling stop temperature of accelerated cooling is 450° C. or less. The lower limit of cooling stop temperature is not particularly limited. However, from the perspective of preventing season cracking after accelerated cooling, the cooling stop temperature is preferably 200° C. or more.

When the contents of alloy elements such as C, Mn, Cu, Ni, and Mo are high, and the steel has high tensile strength in particular, the contents of these elements may be adjusted by subjecting the steel pipe to a tempering heat treatment after cooling the steel pipe to room temperature following accelerated cooling. When performed, the tempering heat treatment is performed at the following temperatures.

Tempering Temperature: 400 to 700° C.

When performing the tempering heat treatment, the steel pipe cooled to room temperature after the accelerated cooling is reheated at a tempering temperature of 400 to 700° C. With a tempering temperature of less than 400° C., it is difficult to decrease the tensile strength, and, in some cases, season cracking may occur when the steel pipe after accelerated cooling has high tensile strength. For this reason, the steel pipe, when subjected to a tempering heat treatment, is tempered at a tempering temperature of 400° C. or more. The tempering temperature is preferably 450° C. or more, more preferably 500° C. or more. When tempered at a tempering temperature of more than 700° C., the steel partially transforms into an austenitic phase, and transformation to a ferrite phase occurs in a subsequent cooling process, with the result that the yield strength of the steel pipe decreases. For this reason, the upper limit of tempering temperature is 700° C. when the tempering heat treatment is performed. The tempering temperature is preferably 650° C. or less, more preferably 600° C. or less.

EXAMPLES

Molten steels of the compositions shown in Tables 2 and 3 were made by a method using a converter, and were each cast into a cast piece by continuous casting. In continuous casting, some steels were cast into cast pieces having a rectangular cross section (300 mm in thickness×400 mm in width) while the others were cast into cast pieces having a circular cross section (190 mm in diameter). The cast pieces having a rectangular cross section are columns that are substantially quadrangular in shape, whereas the cast pieces having a circular cross section are substantially cylindrical in shape.

The cast piece having a rectangular cross section was hot rolled into a steel pipe material (billet-rolled steel pipe material) measuring 190 mm or 140 mm in diameter. Seamless steel pipes made from such a steel pipe material are denoted as "Billet rolled" under the heading "Type of steel pipe material" in Tables 4 to 7. Seamless steel pipes made directly from the cast pieces (steel pipe material, or direct-cast steel pipe material) having a circular cross section with a diameter of 190 mm prepared in continuous casting are denoted as "Direct cast" under the heading "Type of steel pipe material" in Tables 4 to 7.

These steel pipe materials were heated, and hot rolled into seamless steel pipes having the wall thicknesses and the outer diameters shown in Tables 4 to 7 (tubing process). The hot rolling of the preheated steel pipe material was performed by a process starting from piercing followed by mandrel mill rolling and ending with diameter reduction rolling. The heating temperature and hot rolling end temperature of the steel pipe material are as shown in Tables 4 to 7 under the heading "Tubing conditions".

Steel pipe materials are indicated as "Failed tubing" under the heading "Remarks" in Tables 4 to 7 when the tubing process was forced to stop during hot rolling because of difficulties such as overloading, and the indication "Fail" is used under the heading "Formability" in Tables 8 to 11. Steel pipe materials are indicated as "Successful tubing" under the heading "Remarks" in Tables 4 to 7 when the tubing process successfully produced seamless steel pipes without being stopped.

After hot rolling, the steel pipe was allowed to cool to room temperature, and subjected to a nondestructive testing to check for defects in inner and outer surfaces of the pipe. The presence or absence of defects, and the success or failure of defect removal after repair are indicated under the heading "Formability" in Tables 8 to 11. The result is "Excellent" when no defects were observed in a nondestructive testing, "Satisfactory" when defects were observed in a nondestructive testing but the required criteria were satisfied after repair, and "Unsatisfactory" when defects were observed in a nondestructive testing, and repair was impossible or the required criteria were not satisfied even after repair. Formability was determined as being desirable when the evaluation result was "Excellent" or "Satisfactory", with the former being more desirable. The term "repair" means removing scratch and other defects using, for example, a cutting device.

The steel pipes were then subjected to a steel pipe heat treatment (normalizing heat treatment and subsequent accelerated cooling, followed optionally by a tempering heat treatment) under the steel pipe heat treatment conditions shown in Tables 4 to 7. In Tables 4 to 7, the symbol "-" means a lack of treatment.

The steel pipe after accelerated cooling (after air cooling for steel pipes subjected to air cooling) was allowed to stand for 48 hours after the steel pipe temperature had cooled to room temperature, and subjected to a nondestructive testing to check for cracking in a pipe outer surface, in order to evaluate post-cooling season cracking. The presence or absence of season cracking, and the success or failure of crack removal after repair are indicated under the heading "Post-cooling season cracking" in Tables 8 to 11. Steel pipes indicated by "Unsatisfactory" and "Fail" under the heading "Formability" were not evaluated for season cracking, and the symbol "-" is used under the heading "Post-cooling season cracking" in Tables 8 to 11. The evaluation result is "Excellent" when season cracking was not observed in a nondestructive testing, "Satisfactory" when season cracking was observed in a nondestructive testing but the required criteria were satisfied after repair, and "Fail" when season cracking was observed in a nondestructive testing, and repair was impossible or the required criteria were not satisfied even after repair. Steel pipes with "Excellent" or "Satisfactory" results were regarded as highly inhibitory against season cracking, with "Excellent" being more desirable.

Samples for structure observation, tensile test specimens, and corrosion test specimens for corrosion testing in a sulfuric acid dew-point environment were taken from the seamless steel pipes produced in the manner described above.

An observation sample was taken from arbitrarily chosen longitudinal and circumferential locations of the steel pipe, and a cross section orthogonal to the longitudinal direction of the steel pipe was polished to a mirror finish to provide an observation surface. For observation of microstructure, the surface was etched with a 5% solution of nitric acid and alcohol. After etching, randomly chosen four fields at the center of the wall thickness of the observation sample were photographed with a light microscope (400×). For each micrograph, the area percentages of ferrite phase and pearlite phase were calculated by image processing. The remainder structure other than the ferrite phase and pearlite phase in the microstructure was also specified, and the total area percentage of the remainder structure was determined by subtracting the area percentages of ferrite phase and pearlite phase from the total area percentage (100%) of the all phases.

Tables 8 to 11 show the area percentage of ferrite phase, the area percentage of pearlite phase, and the type and the total area percentage of remainder microstructure for each seamless steel pipe. A seamless steel pipe according to aspects of the present invention has a structure with an acceptable area percentage of ferrite phase of 50 to 65%, preferably 55 to 60%. A seamless steel pipe according to aspects of the present invention has a structure with an acceptable area percentage of pearlite phase of 2% or less, preferably 0%. In Tables 8 to 11, for example, the type of remainder structure "Bainite+martensite" means that the remainder structure consists of a bainite phase and a martensitic phase.

A tensile test specimen was taken from arbitrarily chosen longitudinal and circumferential locations of the steel pipe. Steel pipes with an outer diameter of less than 170 mm were prepared into test specimens according to JIS Z2241 12B, whereas steel pipes with an outer diameter of 170 mm or more were prepared into test specimens according to JIS Z2241 12C.

The tensile test was conducted according to JIS Z2241. The yield strength and tensile strength obtained in the tensile test are shown in Tables 8 to 11. Steel pipes were determined as being acceptable when the yield strength was 230 MPa or more, and the tensile strength was 380 MPa or more.

For the corrosion test performed in a sulfuric acid dew-point environment, a corrosion test specimen (30 mm in length×20 mm in width×5 mm in thickness) including an outer surface of steel pipe was taken from the outer surface side of steel pipe, and a surface corresponding to the outer surface side of steel pipe was ground by 0.5 mm to remove unwanted components such as scale. The corrosion test was conducted in a sulfuric acid dew-point environment, as follows. The test environment was created by simulating an environment with a 70 mass % sulfuric acid dew-point concentration at around 50° C., a temperature region where the most severe corrosion should occur in a heat recovery pipe of a heat recovery steam generator. Specifically, a sulfuric acid aqueous solution that had been adjusted to a concentration of 70 mass % was poured into a container, and the corrosion test specimen was immersed in the solution after the solution was heated and maintained at 50° C. with an external thermostat bath. The specimen was immersed for 96 hours. After 96-hour immersion, the sulfuric acid aqueous solution was discharged from the container, and the corrosion test specimen was dried, and carefully taken out for weight measurement. The corrosion rate was calculated from the pre-measured surface area and weight of the corrosion test specimen before corrosion test, the weight of corrosion test specimen measured after immersion, and the immersion time. The results are presented in Tables 8 to 11. In the corrosion test, specimens were determined as being acceptable when the corrosion rate was 20 mg/cm$^2$/h or less. The corrosion rate is preferably 15 mg/cm$^2$/h or less, more preferably 10 mg/cm$^2$/h or less.

In Tables 8 to 11, test specimens with the symbol "-" are test specimens that were not subjected to the structure observation, the tensile test, and the corrosion test in a sulfuric acid dew-point environment.

TABLE 2

| Steel No. | C | Si | Mn | P | S | Al | Cu | Ni | Mo | Sb | Cr | W | Sn | Co | Ti | Grouping |
|---|---|---|---|---|---|---|---|---|---|---|---|---|---|---|---|---|
| A | 0.05 | 0.2 | 0.71 | 0.009 | 0.002 | 0.021 | 0.40 | 0.25 | 0.15 | 0.06 | 0.002 | 0.001 | — | — | — | Compliant Example |
| B | 0.02 | 0.4 | 1.38 | 0.011 | 0.001 | 0.033 | 0.29 | 0.19 | 0.14 | 0.09 | 0.001 | 0.002 | — | — | — | Compliant Example |
| C | 0.08 | 0.1 | 0.75 | 0.013 | 0.002 | 0.038 | 0.31 | 0.16 | 0.14 | 0.08 | 0.002 | 0.001 | — | — | — | Compliant Example |
| D | 0.03 | 0.6 | 1.24 | 0.025 | 0.007 | 0.029 | 0.42 | 0.22 | 0.16 | 0.07 | 0.001 | 0.001 | — | — | — | Compliant Example |
| E | 0.01 | 0.3 | 1.77 | 0.014 | 0.002 | 0.057 | 0.50 | 0.23 | 0.15 | 0.05 | 0.002 | 0.002 | — | — | — | Compliant Example |
| F | 0.11 | 0.2 | 0.54 | 0.012 | 0.003 | 0.031 | 0.22 | 0.12 | 0.16 | 0.06 | 0.003 | 0.002 | — | — | — | Compliant Example |
| G | 0.04 | 0.3 | 1.02 | 0.013 | 0.014 | 0.015 | 0.33 | 0.14 | 0.14 | 0.07 | 0.003 | 0.001 | — | — | — | Compliant Example |
| H | 0.03 | 0.4 | 1.16 | 0.015 | 0.003 | 0.036 | 0.60 | 0.24 | 0.18 | 0.08 | 0.004 | 0.002 | — | — | — | Compliant Example |
| I | 0.02 | 0.4 | 1.08 | 0.012 | 0.002 | 0.021 | 0.14 | 0.29 | 0.15 | 0.03 | 0.002 | 0.001 | — | — | — | Compliant Example |
| J | 0.06 | 0.3 | 0.88 | 0.011 | 0.001 | 0.024 | 0.11 | 0.13 | 0.16 | 0.17 | 0.003 | 0.001 | — | — | — | Compliant Example |
| K | 0.03 | 0.2 | 1.36 | 0.008 | 0.003 | 0.034 | 0.20 | 0.07 | 0.11 | 0.09 | 0.001 | 0.001 | — | — | — | Compliant Example |
| L | 0.02 | 0.5 | 1.93 | 0.013 | 0.001 | 0.012 | 0.47 | 0.41 | 0.07 | 0.28 | 0.002 | 0.002 | — | — | — | Compliant Example |
| M | 0.05 | 0.1 | 0.24 | 0.008 | 0.004 | 0.093 | 0.78 | 0.50 | 0.13 | 0.31 | 0.001 | 0.002 | — | — | — | Compliant Example |
| N | 0.04 | 0.2 | 0.75 | 0.011 | 0.002 | 0.024 | 0.36 | 0.22 | 0.14 | 0.07 | 0.004 | 0.001 | 0.15 | — | — | Compliant Example |
| O | 0.05 | 0.3 | 0.77 | 0.012 | 0.003 | 0.023 | 0.39 | 0.23 | 0.15 | 0.08 | 0.003 | 0.001 | — | 0.06 | — | Compliant Example |
| P | 0.04 | 0.3 | 0.76 | 0.011 | 0.001 | 0.022 | 0.41 | 0.24 | 0.14 | 0.08 | 0.002 | 0.001 | 0.14 | 0.04 | — | Compliant Example |
| Q | 0.02 | 0.3 | 1.35 | 0.014 | 0.003 | 0.029 | 0.33 | 0.23 | 0.13 | 0.08 | 0.001 | 0.002 | — | — | 0.029 | Compliant Example |
| R | 0.03 | 0.2 | 1.33 | 0.012 | 0.002 | 0.033 | 0.32 | 0.22 | 0.13 | 0.07 | 0.003 | 0.002 | 0.15 | — | 0.027 | Compliant Example |
| S | 0.02 | 0.3 | 1.34 | 0.013 | 0.003 | 0.031 | 0.33 | 0.24 | 0.14 | 0.08 | 0.001 | 0.002 | 0.05 | 0.05 | 0.022 | Compliant Example |

TABLE 3

| Steel No. | C | Si | Mn | P | S | Al | Cu | Ni | Mo | Sb | Cr | W | Sn | Co | Ti | Grouping |
|---|---|---|---|---|---|---|---|---|---|---|---|---|---|---|---|---|
| T | 0.13 | 0.2 | 0.55 | 0.011 | 0.002 | 0.028 | 0.20 | 0.13 | 0.15 | 0.06 | 0.002 | 0.001 | — | — | — | Comparative Example |
| U | 0.002 | 0.1 | 0.53 | 0.012 | 0.003 | 0.027 | 0.22 | 0.12 | 0.14 | 0.07 | 0.004 | 0.002 | — | — | — | Comparative Example |
| V | 0.09 | 0.9 | 0.58 | 0.014 | 0.004 | 0.029 | 0.21 | 0.13 | 0.14 | 0.06 | 0.003 | 0.001 | — | — | — | Comparative Example |
| W | 0.10 | 0.3 | 2.12 | 0.011 | 0.002 | 0.025 | 0.21 | 0.13 | 0.13 | 0.07 | 0.002 | 0.002 | — | — | — | Comparative Example |
| X | 0.11 | 0.2 | 0.04 | 0.012 | 0.001 | 0.026 | 0.23 | 0.12 | 0.14 | 0.07 | 0.004 | 0.002 | — | — | — | Comparative Example |
| Y | 0.12 | 0.3 | 0.54 | 0.053 | 0.003 | 0.027 | 0.29 | 0.14 | 0.13 | 0.08 | 0.003 | 0.001 | — | — | — | Comparative Example |
| Z | 0.09 | 0.2 | 0.56 | 0.009 | 0.044 | 0.031 | 0.22 | 0.12 | 0.13 | 0.07 | 0.002 | 0.002 | — | — | — | Comparative Example |
| AA | 0.10 | 0.3 | 0.55 | 0.012 | 0.002 | 0.160 | 0.31 | 0.13 | 0.14 | 0.06 | 0.004 | 0.001 | — | — | — | Comparative Example |
| AB | 0.12 | 0.2 | 0.57 | 0.013 | 0.002 | 0.029 | 0.93 | 0.50 | 0.13 | 0.07 | 0.003 | 0.002 | — | — | — | Comparative Example |
| AC | 0.11 | 0.3 | 0.55 | 0.011 | 0.003 | 0.024 | 0.02 | 0.25 | 0.12 | 0.08 | 0.001 | 0.001 | — | — | — | Comparative Example |
| AD | 0.10 | 0.3 | 0.54 | 0.008 | 0.001 | 0.022 | 0.22 | 0.003 | 0.13 | 0.06 | 0.002 | 0.001 | — | — | — | Comparative Example |
| AE | 0.12 | 0.2 | 0.58 | 0.011 | 0.002 | 0.026 | 0.32 | 0.14 | 0.26 | 0.07 | 0.004 | 0.002 | — | — | — | Comparative Example |
| AF | 0.11 | 0.3 | 0.56 | 0.012 | 0.003 | 0.023 | 0.31 | 0.13 | 0.004 | 0.06 | 0.001 | 0.001 | — | — | — | Comparative Example |
| AG | 0.11 | 0.3 | 0.55 | 0.013 | 0.002 | 0.025 | 0.29 | 0.15 | 0.14 | 0.80 | 0.002 | 0.001 | — | — | — | Comparative Example |
| AH | 0.09 | 0.2 | 0.53 | 0.010 | 0.001 | 0.021 | 0.23 | 0.12 | 0.14 | 0.001 | 0.003 | 0.002 | — | — | — | Comparative Example |
| AI | 0.10 | 0.2 | 0.57 | 0.011 | 0.003 | 0.024 | 0.31 | 0.16 | 0.13 | 0.07 | 0.005 | 0.001 | — | — | — | Comparative Example |
| AJ | 0.09 | 0.3 | 0.56 | 0.012 | 0.002 | 0.023 | 0.21 | 0.15 | 0.14 | 0.06 | 0.004 | 0.003 | — | — | — | Comparative Example |
| AK | 0.12 | 0.3 | 0.54 | 0.013 | 0.003 | 0.026 | 0.32 | 0.17 | 0.001 | 0.26 | 0.002 | 0.036 | — | — | — | Comparative Example |
| AL | 0.11 | 0.2 | 0.53 | 0.011 | 0.002 | 0.024 | 0.22 | 0.18 | 0.06 | 0.01 | 0.080 | 0.001 | — | — | — | Comparative Example |
| AM | 0.06 | 0.3 | 0.88 | 0.010 | 0.002 | 0.023 | 0.31 | 0.14 | 0.002 | 0.27 | 0.060 | 0.002 | — | 0.12 | — | Comparative Example |
| AN | 0.12 | 0.2 | 0.55 | 0.011 | 0.002 | 0.028 | 0.20 | 0.16 | 0.001 | 0.27 | 0.221 | 0.002 | — | — | 0.008 | Comparative Example |
| AO | 0.09 | 0.3 | 0.55 | 0.012 | 0.003 | 0.025 | 0.22 | 0.16 | 0.001 | 0.28 | 0.213 | 0.001 | — | 0.14 | 0.011 | Comparative Example |
| AP | 0.13 | 0.2 | 0.56 | 0.011 | 0.002 | 0.026 | 0.21 | 0.15 | 0.002 | 0.26 | 0.218 | 0.014 | — | — | 0.009 | Comparative Example |
| AQ | 0.10 | 0.3 | 0.57 | 0.013 | 0.002 | 0.027 | 0.28 | 0.14 | 0.001 | 0.27 | 0.205 | 0.001 | 0.04 | — | 0.013 | Comparative Example |

TABLE 4

| | | | | | Tubing conditions | | Steel pipe heat treatment conditions | | | | | |
|---|---|---|---|---|---|---|---|---|---|---|---|---|
| Steel pipe No. | Steel No. | Type of steel pipe material | Wall thickness (mm) | Outer diameter (mm) | Steel pipe material heating temp. (° C.) | Hot rolling end temp. (° C.) | Normalizing temp. (° C.) | Average cooling rate (° C./s) | Accelerated cooling stop temp. (° C.) | Tempering temp. (° C.) | Remarks | Grouping |
| 1-1 | A | Direct cast | 10.5 | 140 | 1265 | 866 | 921 | 25 | 446 | — | manufacturable | Compliant Example |
| 1-2 | A | Direct cast | 10.5 | 140 | 1261 | 864 | 920 | 24 | 340 | — | manufacturable | Compliant Example |

TABLE 4-continued

| Steel pipe No. | Steel No. | Type of steel pipe material | Tubing conditions | | | | Steel pipe heat treatment conditions | | | | Remarks | Grouping |
|---|---|---|---|---|---|---|---|---|---|---|---|---|
| | | | Wall thickness (mm) | Outer diameter (mm) | Steel pipe material heating temp. (° C.) | Hot rolling end temp. (° C.) | Normalizing temp. (° C.) | Average cooling rate (° C./s) | Accelerated cooling stop temp. (° C.) | Tempering temp. (° C.) | | |
| 1-3 | A | Direct cast | 10.5 | 140 | 1262 | 858 | 920 | 25 | 220 | 505 | manufacturable | Compliant Example |
| 1-4 | A | Direct cast | 10.5 | 140 | 1263 | 862 | 919 | Normalizing heat treatment followed by air cooling | | | manufacturable | Comparative Example |
| 1-5 | A | Direct cast | 10.5 | 140 | 1271 | 863 | 918 | 53 | 344 | — | manufacturable | Comparative Example |
| 1-6 | A | Direct cast | 10.5 | 140 | 1267 | 851 | 919 | 4 | 205 | — | manufacturable | Comparative Example |
| 1-7 | A | Direct cast | 10.5 | 140 | 1266 | 856 | 921 | 24 | 513 | — | manufacturable | Comparative Example |
| 1-8 | A | Direct cast | 10.5 | 140 | 1263 | 857 | 919 | 25 | 218 | 722 | manufacturable | Comparative Example |
| 1-9 | A | Direct cast | 10.5 | 140 | 1266 | 852 | 1061 | 25 | 437 | — | manufacturable | Comparative Example |
| 1-10 | A | Direct cast | 10.5 | 140 | 1264 | 858 | 833 | 24 | 434 | — | manufacturable | Comparative Example |
| 1-11 | A | Direct cast | 10.5 | 140 | 1314 | 892 | 922 | 24 | 431 | — | manufacturable | Comparative Example |
| 1-12 | B | Billet rolled | 8.6 | 114 | 1278 | 853 | 949 | 24 | 303 | — | manufacturable | Compliant Example |
| 1-13 | C | Direct cast | 10.5 | 140 | 1271 | 867 | 911 | 21 | 214 | 551 | manufacturable | Compliant Example |

TABLE 5

| Steel pipe No. | Steel No. | Type of steel pipe material | Tubing conditions | | | | Steel pipe heat treatment conditions | | | | Remarks | Grouping |
|---|---|---|---|---|---|---|---|---|---|---|---|---|
| | | | Wall thickness (mm) | Outer diameter (mm) | Steel pipe material heating temp. (° C.) | Hot rolling end temp. (° C.) | Normalizing temp. (° C.) | Average cooling rate (° C./s) | Accelerated cooling stop temp. (° C.) | Tempering temp. (° C.) | | |
| 1-14 | D | Direct cast | 10.5 | 140 | 1269 | 878 | 941 | 22 | 455 | — | manufacturable | Compliant Example |
| 1-15 | E | Billet rolled | 8.6 | 114 | 1284 | 836 | 967 | 29 | 309 | — | manufacturable | Compliant Example |
| 1-16 | F | Direct cast | 10.5 | 140 | 1264 | 863 | 918 | 23 | 438 | — | manufacturable | Compliant Example |
| 1-17 | G | Direct cast | 10.5 | 140 | 1267 | 861 | 937 | 24 | 433 | — | manufacturable | Compliant Example |
| 1-18 | H | Direct cast | 12.7 | 179 | 1244 | 886 | 882 | 18 | 444 | — | manufacturable | Compliant Example |
| 1-19 | I | Direct cast | 8.6 | 114 | 1287 | 851 | 943 | 32 | 312 | — | manufacturable | Compliant Example |
| 1-20 | J | Direct cast | 10.5 | 140 | 1269 | 871 | 933 | 26 | 281 | 576 | manufacturable | Compliant Example |
| 1-21 | K | Direct cast | 10.5 | 140 | 1263 | 868 | 944 | 26 | 434 | — | manufacturable | Compliant Example |
| 1-22 | L | Direct cast | 8.6 | 114 | 1281 | 811 | 958 | 33 | 314 | — | manufacturable | Compliant Example |
| 1-23 | M | Direct cast | 12.7 | 179 | 1295 | 893 | 887 | 11 | 428 | — | manufacturable | Compliant Example |
| 1-24 | N | Direct cast | 10.5 | 140 | 1261 | 861 | 923 | 25 | 429 | — | manufacturable | Compliant Example |
| 1-25 | O | Direct cast | 10.5 | 140 | 1263 | 862 | 922 | 24 | 431 | — | manufacturable | Compliant Example |
| 1-26 | P | Billet rolled | 10.5 | 140 | 1262 | 859 | 924 | 25 | 211 | 507 | manufacturable | Compliant Example |
| 1-27 | Q | Direct cast | 8.6 | 114 | 1277 | 851 | 947 | 25 | 331 | — | manufacturable | Compliant Example |
| 1-28 | R | Direct cast | 10.5 | 140 | 1258 | 862 | 939 | 24 | 229 | 512 | manufacturable | Compliant Example |
| 1-29 | S | Billet rolled | 10.5 | 140 | 1261 | 858 | 940 | 25 | 221 | 504 | manufacturable | Compliant Example |

TABLE 6

| Steel pipe No. | Steel No. | Type of steel pipe material | Wall thickness (mm) | Outer diameter (mm) | Tubing conditions | | Steel pipe heat treatment conditions | | | | Remarks | Grouping |
|---|---|---|---|---|---|---|---|---|---|---|---|---|
| | | | | | Steel pipe material heating temp. (°C.) | Hot rolling end temp. (°C.) | Normalizing temp. (°C.) | Average cooling rate (°C./s) | Accelerated cooling stop temp. (°C.) | Tempering temp. (°C.) | | |
| 1-30 | T | Direct cast | 10.5 | 140 | 1259 | 871 | 926 | 23 | 447 | — | manufacturable | Comparative Example |
| 1-31 | U | Direct cast | 10.5 | 140 | 1262 | 869 | 924 | 24 | 439 | — | manufacturable | Comparative Example |
| 1-32 | V | Direct cast | 10.5 | 140 | 1261 | 872 | 923 | 24 | 440 | — | manufacturable | Comparative Example |
| 1-33 | W | Direct cast | 10.5 | 140 | 1262 | 868 | 925 | 23 | 441 | — | manufacturable | Comparative Example |
| 1-34 | X | Direct cast | 10.5 | 140 | 1259 | 872 | 924 | 24 | 438 | — | manufacturable | Comparative Example |
| 1-35 | Y | Direct cast | 10.5 | 140 | 1261 | 871 | 922 | 24 | 442 | — | manufacturable | Comparative Example |
| 1-36 | Z | Direct cast | 10.5 | 140 | 1260 | 867 | 927 | 23 | 444 | — | manufacturable | Comparative Example |
| 1-37 | AA | Direct cast | 10.5 | 140 | 1262 | 869 | 926 | 24 | 445 | — | manufacturable | Comparative Example |
| 1-38 | AB | Direct cast | 10.5 | 140 | 1279 | 873 | — | — | — | — | manufacturable | Comparative Example |
| 1-39 | AC | Direct cast | 10.5 | 140 | 1258 | 870 | 924 | 23 | 443 | — | manufacturable | Comparative Example |
| 1-40 | AD | Direct cast | 10.5 | 140 | 1277 | 871 | — | — | — | — | manufacturable | Comparative Example |
| 1-41 | AE | Direct cast | 10.5 | 140 | 1257 | 874 | 923 | 24 | 438 | — | manufacturable | Comparative Example |
| 1-42 | AF | Direct cast | 10.5 | 140 | 1259 | 871 | 926 | 23 | 440 | — | manufacturable | Comparative Example |
| 1-43 | AG | Direct cast | 10.5 | 140 | 1279 | 877 | — | — | — | — | Failed hot rolling | Comparative Example |
| 1-44 | AH | Direct cast | 10.5 | 140 | 1262 | 867 | 921 | 24 | 437 | — | manufacturable | Comparative Example |
| 1-45 | AI | Direct cast | 10.5 | 140 | 1261 | 871 | 923 | 23 | 449 | — | manufacturable | Comparative Example |
| 1-46 | AJ | Direct cast | 10.5 | 140 | 1258 | 874 | 926 | 24 | 448 | — | manufacturable | Comparative Example |

TABLE 7

| Steel pipe No. | Steel No. | Type of steel pipe material | Wall thickness (mm) | Outer diameter (mm) | Tubing conditions | | Steel pipe heat treatment conditions | | | | Remarks | Grouping |
|---|---|---|---|---|---|---|---|---|---|---|---|---|
| | | | | | Steel pipe material heating temp. (°C.) | Hot rolling end temp. (°C.) | Normalizing temp. (°C.) | Average cooling rate (°C./s) | Accelerated cooling stop temp. (°C.) | Tempering temp. (°C.) | | |
| 1-47 | AK | Direct cast | 10.5 | 140 | 1260 | 875 | 925 | Normalizing heat treatment followed by air cooling | | | manufacturable | Comparative Example |
| 1-48 | AK | Direct cast | 10.5 | 140 | 1264 | 878 | 921 | 23 | 445 | — | manufacturable | Comparative Example |
| 1-49 | AL | Direct cast | 10.5 | 140 | 1258 | 881 | 919 | Normalizing heat treatment followed by air cooling | | | manufacturable | Comparative Example |
| 1-50 | AL | Direct cast | 10.5 | 140 | 1261 | 879 | 920 | 24 | 443 | — | manufacturable | Comparative Example |
| 1-51 | AM | Direct cast | 10.5 | 140 | 1262 | 869 | 923 | Normalizing heat treatment followed by air cooling | | | manufacturable | Comparative Example |
| 1-52 | AM | Direct cast | 10.5 | 140 | 1259 | 866 | 922 | 24 | 439 | — | manufacturable | Comparative Example |
| 1-53 | AN | Direct cast | 10.5 | 140 | 1257 | 861 | 928 | Normalizing heat treatment followed by air cooling | | | manufacturable | Comparative Example |
| 1-54 | AN | Direct cast | 10.5 | 140 | 1256 | 859 | 929 | 25 | 438 | — | manufacturable | Comparative Example |
| 1-55 | AO | Direct cast | 10.5 | 140 | 1263 | 871 | 924 | Normalizing heat treatment followed by air cooling | | | manufacturable | Comparative Example |

TABLE 7-continued

| Steel pipe No. | Steel No. | Type of steel pipe material | Wall thickness (mm) | Outer diameter (mm) | Steel pipe material heating temp. (°C.) | Hot rolling end temp. (°C.) | Normalizing temp. (°C.) | Average cooling rate (°C./s) | Accelerated cooling stop temp. (°C.) | Tempering temp. (°C.) | Remarks | Grouping |
|---|---|---|---|---|---|---|---|---|---|---|---|---|
| 1-56 | AO | Direct cast | 10.5 | 140 | 1261 | 868 | 926 | 24 | 442 | — | manufacturable | Comparative Example |
| 1-57 | AP | Direct cast | 10.5 | 140 | 1255 | 872 | 922 | Normalizing heat treatment followed by air cooling | | | manufacturable | Comparative Example |
| 1-58 | AP | Direct cast | 10.5 | 140 | 1257 | 874 | 924 | 24 | 441 | — | manufacturable | Comparative Example |
| 1-59 | AQ | Direct cast | 10.5 | 140 | 1252 | 878 | 929 | Normalizing heat treatment followed by air cooling | | | manufacturable | Comparative Example |
| 1-60 | AQ | Direct cast | 10.5 | 140 | 1249 | 876 | 927 | 23 | 439 | — | manufacturable | Comparative Example |

TABLE 8

| Steel pipe No. | Steel No. | Formability | Post-cooling season cracking | Structure | | | Tensile properties | | Corrosion rate in Corrosion test*[2] with 96-h immersion (mg/cm$^2$/h) | Grouping |
|---|---|---|---|---|---|---|---|---|---|---|
| | | | | Area percentage of ferrite phase (%) | Area percentage of pearlite phase (%) | Type and total area percentage*[1] of remainder structure (%) | Yield strength (MPa) | Tensile strength (MPa) | | |
| 1-1 | A | Excellent | Excellent | 56 | 0 | Bainite (44) | 288 | 551 | 8 | Compliant Example |
| 1-2 | A | Excellent | Excellent | 57 | 0 | Bainite + martensite (43) | 292 | 573 | 9 | Compliant Example |
| 1-3 | A | Excellent | Excellent | 52 | 0 | Martensite (48) | 457 | 594 | 8 | Compliant Example |
| 1-4 | A | Excellent | Excellent | 64 | 19 | Bainite (17) | 263 | 508 | 28 | Comparative Example |
| 1-5 | A | Excellent | Fail | 3 | 0 | Bainite + martensite (97) | 311 | 668 | 8 | Comparative Example |
| 1-6 | A | Excellent | Excellent | 61 | 12 | Bainite (27) | 285 | 524 | 23 | Comparative Example |
| 1-7 | A | Excellent | Excellent | 60 | 6 | Bainite (34) | 287 | 533 | 22 | Comparative Example |
| 1-8 | A | Excellent | Excellent | 83 | 0 | Bainite (17) | 211 | 513 | 9 | Comparative Example |
| 1-9 | A | Excellent | Excellent | 51 | 0 | Bainite (49) | 221 | 566 | 9 | Comparative Example |
| 1-10 | A | Excellent | Excellent | 38 | 9 | Bainite (53) | 272 | 586 | 32 | Comparative Example |
| 1-11 | A | Excellent | Excellent | 63 | 4 | Bainite (33) | 282 | 539 | 21 | Comparative Example |
| 1-12 | B | Excellent | Excellent | 58 | 0 | Bainite (42) | 274 | 522 | 10 | Compliant Example |
| 1-13 | C | Excellent | Excellent | 52 | 1 | Martensite (47) | 499 | 629 | 14 | Compliant Example |

*[1] Number in parenthesis is the total area percentage of phases other than ferrite phase and pearlite phase
*[2] Immersion in 50° C. 70 mass % sulfuric acid aqueous solution

TABLE 9

| Steel pipe No. | Steel No. | Formability | Post-cooling season cracking | Area percentage of ferrite phase (%) | Area percentage of pearlite phase (%) | Type and total area percentage*¹ of remainder structure (%) | Yield strength (MPa) | Tensile strength (MPa) | Corrosion rate in Corrosion test*² with 96-h immersion (mg/cm²/h) | Grouping |
|---|---|---|---|---|---|---|---|---|---|---|
| 1-14 | D | Excellent | Satisfactory | 57 | 0 | Bainite (43) | 258 | 471 | 11 | Compliant Example |
| 1-15 | E | Satisfactory | Satisfactory | 64 | 0 | Bainite (36) | 259 | 497 | 16 | Compliant Example |
| 1-16 | F | Excellent | Satisfactory | 51 | 2 | Bainite (47) | 332 | 614 | 18 | Compliant Example |
| 1-17 | G | Satisfactory | Excellent | 61 | 0 | Bainite (39) | 278 | 526 | 14 | Compliant Example |
| 1-18 | H | Satisfactory | Excellent | 59 | 0 | Bainite (41) | 263 | 507 | 10 | Compliant Example |
| 1-19 | I | Excellent | Excellent | 63 | 0 | Bainite (37) | 242 | 518 | 13 | Compliant Example |
| 1-20 | J | Satisfactory | Excellent | 55 | 1 | Bainite + martensite (44) | 413 | 609 | 7 | Compliant Example |
| 1-21 | K | Satisfactory | Excellent | 57 | 1 | Bainite (42) | 275 | 513 | 14 | Compliant Example |
| 1-22 | L | Satisfactory | Satisfactory | 56 | 0 | Bainite (44) | 295 | 534 | 6 | Compliant Example |
| 1-23 | M | Satisfactory | Excellent | 52 | 2 | Bainite (46) | 304 | 512 | 19 | Compliant Example |
| 1-24 | N | Excellent | Excellent | 55 | 0 | Bainite (45) | 283 | 566 | 9 | Compliant Example |
| 1-25 | O | Excellent | Excellent | 56 | 0 | Bainite (44) | 272 | 549 | 8 | Compliant Example |
| 1-26 | P | Excellent | Excellent | 54 | 0 | Bainite + martensite (46) | 466 | 617 | 9 | Compliant Example |
| 1-27 | Q | Excellent | Excellent | 59 | 0 | Bainite + martensite (41) | 288 | 524 | 7 | Compliant Example |
| 1-28 | R | Excellent | Excellent | 56 | 0 | Bainite (44) | 298 | 512 | 7 | Compliant Example |
| 1-29 | S | Excellent | Excellent | 57 | 0 | Bainite (43) | 287 | 523 | 6 | Compliant Example |

*¹Number in parenthesis is the total area percentage of phases other than ferrite phase and pearlite phase
*²Immersion in 50° C., 70 mass % sulfuric acid aqueous solution

TABLE 10

| Steel pipe No. | Steel No. | Formability | Post-cooling season cracking | Area percentage of ferrite phase (%) | Area percentage of pearlite phase (%) | Type and total area percentage*¹ of remainder structure (%) | Yield strength (MPa) | Tensile strength (MPa) | Corrosion rate in Corrosion test*² with 96-h immersion (mg/cm²/h) | Grouping |
|---|---|---|---|---|---|---|---|---|---|---|
| 1-30 | T | Excellent | Fail | 50 | 1 | Bainite (49) | 343 | 658 | 13 | Comparative Example |
| 1-31 | U | Excellent | Excellent | 66 | 0 | Bainite (34) | 204 | 379 | 19 | Comparative Example |
| 1-32 | V | Excellent | Excellent | 53 | 2 | Bainite (45) | 374 | 618 | 23 | Comparative Example |
| 1-33 | W | Excellent | Fail | 52 | 0 | Bainite (48) | 329 | 698 | 11 | Comparative Example |
| 1-34 | X | Excellent | Excellent | 76 | 1 | Bainite (23) | 211 | 359 | 19 | Comparative Example |
| 1-35 | Y | Satisfactory | Satisfactory | 51 | 0 | Bainite (49) | 336 | 659 | 28 | Comparative Example |
| 1-36 | Z | Satisfactory | Excellent | 50 | 1 | Bainite (49) | 299 | 608 | 25 | Comparative Example |
| 1-37 | AA | Excellent | Excellent | 50 | 0 | Bainite (50) | 303 | 617 | 22 | Comparative Example |

TABLE 10-continued

| Steel pipe No. | Steel No. | Formability | Post-cooling season cracking | Area percentage of ferrite phase (%) | Area percentage of pearlite phase (%) | Type and total area percentage*1 of remainder structure (%) | Yield strength (MPa) | Tensile strength (MPa) | Corrosion rate in Corrosion test*2 with 96-h immersion (mg/cm²/h) | Grouping |
|---|---|---|---|---|---|---|---|---|---|---|
| 1-38 | AB | Unsatisfactory | — | — | — | — | — | — | — | Comparative Example |
| 1-39 | AC | Excellent | Excellent | 53 | 0 | Bainite (47) | 283 | 599 | 39 | Comparative Example |
| 1-40 | AD | Unsatisfactory | — | — | — | — | — | — | — | Comparative Example |
| 1-41 | AE | Excellent | Excellent | 54 | 0 | Bainite (46) | 314 | 642 | 31 | Comparative Example |
| 1-42 | AF | Excellent | Excellent | 50 | 6 | Bainite (44) | 270 | 559 | 28 | Comparative Example |
| 1-43 | AG | Fail | — | — | — | — | — | — | — | Comparative Example |
| 1-44 | AH | Excellent | Excellent | 52 | 0 | Bainite (48) | 329 | 613 | 33 | Comparative Example |
| 1-45 | AI | Satisfactory | Fail | 53 | 0 | Bainite (47) | 337 | 667 | 14 | Comparative Example |
| 1-46 | AJ | Satisfactory | Fail | 55 | 2 | Bainite (43) | 328 | 611 | 17 | Comparative Example |

*1 Number in parenthesis is the total area percentage of phases other than ferrite phase and pearlite phase
*2 Immersion in 50° C., 70 mass % sulfuric acid aqueous solution

TABLE 11

| Steel pipe No. | Steel No. | Formability | Post-cooling season cracking | Area percentage of ferrite phase (%) | Area percentage of pearlite phase (%) | Type and total area percentage*1 of remainder structure (%) | Yield strength (MPa) | Tensile strength (MPa) | Corrosion rate in Corrosion test*2 with 96-h immersion (mg/cm²/h) | Grouping |
|---|---|---|---|---|---|---|---|---|---|---|
| 1-47 | AK | Excellent | Excellent | 73 | 11 | Bainite (16) | 224 | 455 | 34 | Comparative Example |
| 1-48 | AK | Excellent | Fail | 44 | 1 | Bainite (55) | 311 | 562 | 18 | Comparative Example |
| 1-49 | AL | Excellent | Excellent | 49 | 7 | Bainite (44) | 276 | 422 | 29 | Comparative Example |
| 1-50 | AL | Excellent | Fail | 42 | 0 | Bainite (58) | 299 | 581 | 13 | Comparative Example |
| 1-51 | AM | Excellent | Excellent | 78 | 5 | Bainite (17) | 229 | 418 | 24 | Comparative Example |
| 1-52 | AM | Excellent | Fail | 47 | 2 | Bainite (51) | 278 | 554 | 14 | Comparative Example |
| 1-53 | AN | Excellent | Excellent | 84 | 13 | Bainite (3) | 228 | 414 | 38 | Comparative Example |
| 1-54 | AN | Excellent | Fail | 45 | 2 | Bainite (53) | 335 | 551 | 14 | Comparative Example |
| 1-55 | AO | Excellent | Excellent | 82 | 14 | Bainite (4) | 211 | 382 | 29 | Comparative Example |
| 1-56 | AO | Excellent | Fail | 39 | 1 | Bainite (60) | 304 | 582 | 11 | Comparative Example |
| 1-57 | AP | Excellent | Excellent | 77 | 20 | Bainite (3) | 222 | 417 | 41 | Comparative Example |
| 1-58 | AP | Excellent | Fail | 41 | 0 | Bainite (59) | 298 | 579 | 13 | Comparative Example |
| 1-59 | AQ | Excellent | Excellent | 83 | 12 | Bainite (5) | 208 | 374 | 27 | Comparative Example |
| 1-60 | AQ | Satisfactory | Fail | 43 | 1 | Bainite (56) | 301 | 588 | 12 | Comparative Example |

*1 Number in parenthesis is the total area percentage of phases other than ferrite phase and pearlite phase
*2 Immersion in 50° C., 70 mass % sulfuric acid aqueous solution In present examples (steel pipe Nos. 1-1 to 1-3, and steel pipe Nos. 1-12 to 1-29) in which the steel compositions and manufacturing conditions, and the observation results for steel microstructure were within the ranges according to aspects of the present invention, defects were not observed in inner and outer surfaces of the steel pipe in the nondestructive testing conducted to find defects occurring in the pipe during its formation. Even when present, the defects were minor, and the steel pipes passed the test after repair. The steel pipes of the present examples also had no delayed cracking (season cracking) in pipe outer surfaces in the nondestructive testing conducted after the steel pipe heat treatment for the purpose of finding season cracking after the steel pipe heat treatment (normalizing heat treatment and subsequent accelerated cooling). Even when present, the cracks were minor, and the steel pipes passed the test after repair. The steel pipes of the present examples also satisfied the yield strength and tensile strength required as seamless steel pipes for piping, and had desirable sulfuric acid dew-point corrosion resistance with a corrosion rate of 20 mg/cm$^2$/h or less in the corrosion test conducted under a severe sulfuric acid dew-point corrosive environment, specifically, by immersing the steel pipe in a 50° C., 70 mass % sulfuric acid aqueous solution for 96 hours.

In contrast, in comparative examples (steel pipe Nos. 1-4) in which the steel pipes were air cooled after the normalizing heat treatment, the area percentage of pearlite phase exceeded the upper limit of the range of the present invention, and the corrosion rate in a sulfuric acid dew-point environment was 28 mg/cm$^2$/h, failing to satisfy the target range.

In comparative examples (steel pipe Nos. 1-6, 1-7, 1-10, and 1-11) in which the steel pipe heat treatment conditions or tubing conditions did not fall in the ranges of the present invention, the area percentage of pearlite phase also exceeded the upper limit of the range of the present invention, and the corrosion rate in an sulfuric acid dew-point environment failed to satisfy the target range.

In comparative example (steel pipe No. 1-5) in which the average cooling rate of accelerated cooling after the normalizing heat treatment was higher than the upper limit of the range of the present invention, the area percentage of ferrite phase was below the lower limit of the range of the present invention, and the total area percentage of bainite phase and martensitic phase was 97%, causing season cracking. The cracks were unremovable even after repair.

In comparative example (steel pipe No. 1-8) in which the tempering temperature of the tempering heat treatment performed after accelerated cooling following normalizing heat treatment was higher than the upper limit of the range of the present invention, the steel pipe failed to achieve the desired yield strength of 230 MPa or more. The desired yield strength of 230 MPa or more was also unachievable in comparative example (steel pipe No. 1-9) in which the normalizing temperature of the normalizing heat treatment was higher than the upper limit of the range of the present invention.

The corrosion rate in a sulfuric acid dew-point environment did not satisfy the target range in all of comparative example (steel pipe No. 1-32) in which the Si content in the steel exceeded the upper limit of the range of the present invention, comparative example (steel pipe No. 1-35) in which the P content exceeded the upper limit of the range of the present invention, comparative example (steel pipe No. 1-36) in which the S content exceeded the upper limit of the range of the present invention, and comparative example (steel pipe No. 1-37) in which the Al content exceeded the upper limit of the range of the present invention.

The corrosion rate in a sulfuric acid dew-point environment did not satisfy the target range also in comparative example (steel pipe No. 1-39) in which the Cu content in the steel was below the lower limit of the range of the present invention, and in comparative example (steel pipe No. 1-44) in which the Sb content was below the lower limit of the range of the present invention.

The corrosion rate in a sulfuric acid dew-point environment did not satisfy the target range also in comparative example (steel pipe No. 1-41) in which the Mo content in the steel exceeded the upper limit of the range of the present invention.

In comparative example (steel pipe No. 1-42) in which the Mo content in the steel was below the lower limit of the range of the present invention, the area percentage of pearlite phase was higher than the upper limit of the range of the present invention, and the corrosion rate in a sulfuric acid dew-point environment did not satisfy the target range.

Season cracking occurred after the steel pipe heat treatment (normalizing heat treatment and subsequent accelerated cooling), and the cracks were unremovable even after repair in comparative example (steel pipe No. 1-30) in which the C content in the steel exceeded the upper limit of the range of the present invention, comparative example (steel pipe No. 1-33) in which the Mn content exceeded the upper limit of the range of the present invention, comparative example (steel pipe No. 1-45) in which the Cr content exceeded the upper limit of the range of the present invention, and comparative example (steel pipe No. 1-4 6) in which the W content exceeded the upper limit of the range of the present invention.

The steel pipes had defects in outer surfaces in the nondestructive testing conducted after tubing, and the defects were unremovable even after repair in comparative example (steel pipe No. 1-38) in which the Cu content in the steel exceeded the upper limit of the range of the present invention, and in comparative example (steel pipe No. 1-40) in which the Ni content was below the lower limit of the range of the present invention.

In comparative example (steel pipe No. 1-43) in which the Sb content in the steel exceeded the upper limit of the range of the present invention, the tubing process was stopped because of cracks observed in the outer surface of the pipe during hot rolling in the tubing process, and it was not possible to make a seamless steel pipe.

The area percentage of ferrite phase exceeded the upper limit of the range of the present invention, and the yield strength and tensile strength failed to achieve the desired values in comparative example (steel pipe No. 1-31) in which the C content in the steel was below the lower limit of the range of the present invention, and in comparative example (steel pipe No. 1-34) in which the Mn content was below the lower limit of the range of the present invention.

The area percentage of pearlite phase exceeded the upper limit of the range of the present invention, and the corrosion rate in a sulfuric acid dew-point environment failed to satisfy the target range in comparative examples (steel pipe No. 1-47 and No. 1-57) in which steel No. AK with a Mo content below the lower limit of the range of the present invention, and a W content above the upper limit of the range of the present invention, or steel No. AP with both C and W contents above the upper limits of the ranges of the present invention was air cooled after the normalizing heat treatment of steel pipe. In comparative examples (steel pipe No. 1-48 and No. 1-58) in which the steel pipe was subjected to accelerated cooling after the normalizing heat treatment, the area percentage of pearlite phase fell within the range according to aspects of the present invention, and the corrosion rate in a sulfuric acid dew-point environment satisfied the target range. However, season cracking was observed in the nondestructive testing, and the cracks were unremovable even after repair.

The area percentage of pearlite phase exceeded the upper limit of the range of the present invention, and the corrosion rate in a sulfuric acid dew-point environment failed to satisfy the target range also in comparative example (steel pipe No. 1-49) in which steel No. AL with a Cr content above the upper limit of the range of the present invention was air cooled after the normalizing heat treatment of steel pipe. In comparative example (steel pipe No. 1-50) in which the steel pipe was subjected to accelerated cooling after the normalizing heat treatment, the area percentage of pearlite phase fell within the range according to aspects of the present invention, and the corrosion rate in a sulfuric acid dew-point environment satisfied the target range. However, season cracking was observed in the nondestructive testing, and the cracks were unremovable even after repair.

The area percentage of pearlite phase exceeded the upper limit of the range of the present invention, and the corrosion rate in a sulfuric acid dew-point environment failed to satisfy the target range in comparative examples (steel pipe Nos. 1-51, 1-53, 1-55, and 1-59) in which steel No. AM, AN, AO, or AQ with a Mo content below the lower limit of the range of the present invention, and a Cr content above the upper limit of the range of the present invention was air cooled after the normalizing heat treatment of steel pipe. In comparative examples (steel pipe Nos. 1-52, 1-54, 1-56, and 1-60) in which the steel pipe was subjected to accelerated cooling after the normalizing heat treatment, the area percentage of pearlite phase fell within the range according to aspects of the present invention, and the corrosion rate in a sulfuric acid dew-point environment satisfied the target range. However, season cracking was observed in the nondestructive testing, and the cracks were unremovable even after repair.

The invention claimed is:

1. A seamless steel pipe having a composition comprising, in mass %, C: 0.01 to 0.12%, Si: 0.01 to 0.8%, Mn: 0.10 to 2.00%, P: 0.050% or less, S: 0.040% or less, Al: 0.010 to 0.100%, Cu: 0.03 to 0.80%, Ni: 0.01 to 0.50%, Mo: 0.01 to 0.20%, Sb: 0.06 to 0.50%, Cr: 0.004% or less, W: 0.002% or less, and the balance Fe and incidental impurities, and a structure comprising a ferrite phase having an area percentage of 50 to 65%, a pearlite phase having an area percentage of 1% or less, and one or both of a bainite phase and a martensitic phase representing the remainder, the seamless steel pipe having a yield strength of 230 MPa or more, a tensile strength of 380 MPa or more, and a sulfuric acid dew-point corrosion resistance of 12 $mg/cm^2/h$ or less in terms of corrosion rate under a corrosion test in which a test specimen taken from an outer surface of the seamless steel pipe is immersed for 96 hours in a 70 mass % sulfuric acid aqueous solution heated and maintained at 50° C.

2. The seamless steel pipe according to claim 1, wherein the composition further comprises, in mass %, one or two groups selected from the following group A and group B,
   group A: one or both of Sn: 0.005 to 0.50% and Co: 0.005 to 0.20%,
   group B: Ti: 0.005 to 0.050%.

3. A method for manufacturing the seamless steel pipe according to claim 1,
   the method comprising:
   heating a steel pipe material of said composition to 1,100 to 1,300° C., hot rolling the heated steel pipe material at 800° C. or more into a seamless steel pipe of a predetermined shape, and cooling the seamless steel pipe to room temperature; and
   heating the seamless steel pipe at a normalizing temperature of 850 to 1,050° C. in a normalizing heat treatment, followed by accelerated cooling to a cooling stop temperature of 500° C. or less at an average cooling rate of 10 to 50° C./s.

4. The method according to claim 3, wherein the composition further comprises, in mass %, one or two groups selected from the following group A and group B,
   group A: one or both of Sn: 0.005 to 0.50% and Co: 0.005 to 0.20%,
   group B: Ti: 0.005 to 0.050%.

5. The method according to claim 3, comprising a tempering heat treatment in which the seamless steel pipe after the accelerated cooling is cooled to room temperature, and reheated at a tempering temperature of 400 to 700° C.

6. The method according to claim 4, comprising a tempering heat treatment in which the seamless steel pipe after the accelerated cooling is cooled to room temperature, and reheated at a tempering temperature of 400 to 700° C.

* * * * *